United States Patent
Sangle-Ferriere

(10) Patent No.: US 12,399,995 B2
(45) Date of Patent: Aug. 26, 2025

(54) METHOD FOR SECURING THE USE OF SOFTWARE

(71) Applicant: MARBEUF CONSEIL ET RECHERCHE, Paris (FR)

(72) Inventor: Bruno Sangle-Ferriere, Paris (FR)

(73) Assignee: MARBEUF CONSEIL ET RECHERCHE, Paris (FR)

( * ) Notice: Subject to any disclaimer, the term of this patent is extended or adjusted under 35 U.S.C. 154(b) by 109 days.

(21) Appl. No.: 18/290,127

(22) PCT Filed: May 9, 2022

(86) PCT No.: PCT/EP2022/062406
§ 371 (c)(1),
(2) Date: Nov. 9, 2023

(87) PCT Pub. No.: WO2022/238288
PCT Pub. Date: Nov. 17, 2022

(65) Prior Publication Data
US 2024/0378292 A1    Nov. 14, 2024

(30) Foreign Application Priority Data
May 10, 2021 (FR) ...................... 2104932

(51) Int. Cl.
*G06F 21/00*    (2013.01)
*G06F 21/57*    (2013.01)
*G06F 21/64*    (2013.01)

(52) U.S. Cl.
CPC .............. *G06F 21/57* (2013.01); *G06F 21/64* (2013.01)

(58) Field of Classification Search
None
See application file for complete search history.

(56) References Cited

U.S. PATENT DOCUMENTS 5,944,821 A    8/1999  Angelo
9,712,153 B1 *  7/2017  Regner ................. H03K 17/22
(Continued)

FOREIGN PATENT DOCUMENTS

WO    WO-2016081404 A1 *  5/2016  ............. G06F 21/51

OTHER PUBLICATIONS

Written Opinion (WO) for PCT/EP2022/062406 mailed Aug. 26, 2022 (10 pages).
(Continued)

*Primary Examiner* — Andrew J Steinle
(74) *Attorney, Agent, or Firm* — Jason A. Smith; Shumaker, Loop & Kendrick, LLP

(57) ABSTRACT

A method for securing the use of software intended to be executed by an electronic processor of a device, said electronic processor comprising or having access at least to—a first register containing at least one associated item of information generated beforehand and needed to access data used by said software and/or to encrypt or decrypt communication data with another device, said data being intended for or originating from the software, and to—a second register containing at least one file of the software and/or data needed to identify or to encrypt a file of said software, in particular a hash, in which method, upon any modification of the second register or any request to modify said second register, the first register is reset or said at least one associated item of information of the first register is modified in a predefined manner.

14 Claims, 3 Drawing Sheets

(56) References Cited

U.S. PATENT DOCUMENTS

2010/0185845 A1 7/2010 Takayama et al.
2013/0198530 A1* 8/2013 Wang .................. G09C 1/00
　　　　　　　　　　　　　　　　　　　　713/190

OTHER PUBLICATIONS

International Search Report (ISR) for PCT/EP2022/062406 mailed Aug. 26, 2022 (5 pages).

* cited by examiner

METHOD FOR SECURING THE USE OF SOFTWARE

TECHNICAL FIELD

The present invention relates to the methods and computer program products for securing the use of software intended to be executed by an electronic processor of a unit.

BACKGROUND

Electronic processors execute, when they are powered up, start-up software, placed in read-only memory or in persistent memory, but a memory whose content can be modified. This offers the vendor of the processor the possibility of being able to update the start-up software over time, as explained notably in the U.S. Pat. No. 5,944,821. That also allows a vendor or retailer of the processor to be able to modulate the possible uses of said processor by loading it with different start-up software.

This flexibility does however open the way to illegal software replacements potentially resulting in malfunctions of the processor, even the theft or the corruption of data to which the processor has access. That affects any type of software, notably start-up software, but also software used notably for the checking of software signatures. It is thus important to distinguish and/or prevent a so-called illegal installation or modification, as opposed to a legal installation corresponding to the first installation of software or to a modification already installed, approved by the version of the software already installed or by other software installed legally.

These risks of attack are sometimes limited by the addition of another processor linked to the start-up process which checks that the software publisher is legitimate. This check can also be done by the protected processor itself, which will then execute, on start-up, software for checking the publisher of second start-up software, which will then be executed only if the first software permits it, this permission being given after the checking of the identity of the publisher of the second software.

These checks are however generally done by checking the signature of the checked software, the signature of said software generally comprising the secret word, or hash, of the software, this hash being encrypted such that only the legitimate issuer can have the hash decrypted by the checking software.

Another method for checking start-up software consists in having in addition to start-up software checking software, a register in which is filed the legitimate hash by virtue of which the start-up software will be checked when the software is next started up; this legitimate hash being able to be updated for example by a function included in the initial start-up software.

These techniques can however all be circumvented if it is possible to create by design, software having the same hash as the legitimate software, as disclosed in the application US 2010/0185845. This facility is unfortunately possible, the known encryption methods MD5 and Sha1 being able to be counterfeited.

The advent of quantum computers should moreover also make it possible to counterfeit the encrypted words and therefore render these software checks even more susceptible to circumvention.

The illegal modifications of the software are particularly detrimental for the electronic processors registered with other units or processors, notably in a network or installed base, by rendering their registration null and void if their software is replaced by illegal software.

SUMMARY

There is a need to improve the securing and the protection of the electronic processors or the use thereof, in order to offer in particular a method that makes it possible to overcome the drawbacks of the known methods.

The aim of the invention is to address this need and it achieves it, according to one of its aspects, by virtue of a method for securing the use of software intended to be executed by an electronic processor of a unit, said electronic processor comprising or having access at least to a first register on which there is at least one associated information item previously generated and needed to access data used by said software and/or to encrypt or decrypt communication data with another unit intended for or derived from the software, and to a second register containing at least one file of the software and/or data needed to identify or encrypt a file of said software, notably a hash, a method in which, upon any modification of the second register or any request to modify said second register, the first register is reinitialized or said at least one associated information item of the first register is modified in a predefined manner, such that, in order to access data used by and/or derived from said software, a subsequent modification of the first register is authorized following this reinitialization or this first modification by an instruction of the software having initiated the modification of the second register or by previously determined authorized software.

By virtue of the invention, the use of the software is thus secured: on the one hand, the communications managed by the software for the electronic processor originating from or intended for another unit can no longer be encrypted with keys exchanged with the other unit if said software has not itself initiated its own change or has been approved by authorized software; on the other hand, the data encrypted by the associated information item present on the first register, called security register, is no longer accessible to the software if it has not itself initiated its own change or by authorized software, said information having been erased or modified.

The term "previously determined authorized software" should be understood to mean authorized software recognized by the electronic processor and/or the unit.

In a preferred embodiment of the invention, the method uses an electronic circuit, incorporated in or connected to said electronic processor, configured at least to detect any modification of the second register, called executable register, or any request to modify said second register, and to, following this detection, reinitialize the first register or modify in a predefined manner said at least one associated information item of the first register.

In a variant, the method according to the invention is performed automatically by code instructions executed by one or more processors.

Preferably, the first register is reset to zero upon any modification of the second register or any request to modify said second register. In a variant, said first register is reset to a predefined value other than zero.

Said at least one associated information item of the first register can be deleted and/or regenerated, notably upon the updating or the installation of said software.

Said at least one associated information item of the first register can be modified by a value that is known or generated by said electronic processor of the unit, or by a value transmitted to the unit, or by a value that is previously known and/or transmitted to a server or to another unit of a network within which the unit moves around.

Software to be Secured

Hereinbelow, the term "software" is used, but the invention can also apply to an application intended to be executed by an electronic processor.

Said software is preferably start-up software of the electronic processor.

Said start-up software of the processor can be stored in a persistent memory of a register. The term "persistent memory" should be understood to mean that said register is modifiable but retains the information even when it is no longer powered by an electrical current, unlike a random-access or read-only memory.

In a variant or in combination, said software is management software, ensuring the management of one or more other third-party pieces of software, configured notably to list this or these third-party pieces of software in the unit, replace them with new versions, secure their communications with other units or sign or encrypt documents. In this case, the secret data needed for these operations are deleted if the management software is otherwise modified.

The electronic processor of the unit then comprises or advantageously has access to a switch register, containing at least, for each of these other third-party pieces of software, the identifier of the first and second registers, called security registers and executable registers of each of these pieces of software. Said authorized management software is configured advantageously to check the version of the software to be installed and/or to update, to modify the second register, called executable register, then the first register, called security register, associated with the software to be updated and to update the switch register, after checking the accuracy of the security registers and of the executable registers associated with the updated software.

If the updated software contains functionalities of secure communication with an external electronic device, the new keys used for the installed version are preferably communicated by the software which performs the update and therefore possibly the so-called management software before or during the update; these secret data being advantageously communicated upon the installation of the new version.

Said software intended to be executed by the electronic processor of the unit can initiate its own update and thus render another version of itself available to the unit. In this case, said software preferably checks the validity of said other version, for example by checking the electronic signature of said software if it knows an authentic key of the publisher of the software, for example stored in the first, so-called security register, or by the random hash method, the mix number and the encryption key of the hash being for example one-time keys entered on said first register before the update thereof. A dedicated electronic circuit can be installed on the microprocessor to perform these checks without transmitting to the processor, or to the other parts of the processors, the associated secret information contained in the security register, and notably the one-time key or keys and the number or numbers of mixes used by the random hash procedure.

Associated Information

Said at least one associated information item of the first register can comprise at least one or more encryption keys, notably symmetrical, asymmetrical, public, private, one-time keys, or series of one-time keys. In a variant, said at least one associated information item comprises at least one or more numbers having been generated randomly, notably random numbers called "mixers" as described in the random hash patent.

Such associated information is used, among other things, to secure the communications with other units, or to encrypt, decrypt, or check the authenticity of data used by said software.

The associated information can contain other information, notably the date and time of the modification or the filing of the file of the software on the unit, and/or an identifier making it possible to identify the new version and the old version of said file, their creation dates, their names, their publishers, their hashes and their signatures issued by their own publisher as well as the public key of the publisher used for said signature.

The associated information item or items is or are preferably protected so as not to be able to be modified outside of the procedure of updating and of filing of the software files with which they are associated.

The associated information item or items is or are preferably protected so as to be used only by the software with which the register is associated or the management software.

The associated information item or items is or are preferably protected so as to be used only by electronic circuits allowing the encryption, decryption and the checking of signatures without revealing the content of said security register to the rest of the electronic circuit or to other electronic circuits.

In the case of private encryption keys, the associated information item or items can be generated by the software itself in its old version, before its own update.

In the case of public or one-time encryption keys, they can originate from a remote electronic device with which the unit communicates using said software before its update, or be created by the unit itself to be communicated to them. Other information items can however be accessible at the request of said unit or of the software with which it is associated. Finally, the other information, such as, for example, the date of modification of the file, left publicly accessible, is preferably entered as associated information on the executable register.

The modification or a write on the second register can cause or necessitate the zeroing or the modification of the associated information entered on the first register.

The device preferably comprises a generator of symmetrical, asymmetrical and one-time encryption keys making it possible to store such keys on the security register, preferably not otherwise communicating the private key of the pair of asymmetrical keys to the rest of the processor or to any other electronic circuit, as appropriate, and communicating the other keys, notably the symmetrical and one-time encryption keys, only in an encrypted manner and by using keys present on the security register associated with the same software in its existing version or else with the management software.

Registers

In one embodiment of the invention, the second register contains at least one file of the software.

In a variant, a file of the software being stored in encrypted form on a third register, the second register comprises at least one or more encryption keys used for the decryption and/or the checking of the signature of said encrypted file, notably a symmetrical or asymmetrical key.

Preferably, only the management software or the software of which a file is contained in the second register or of which the signature is entered on the second register can be authorized to modify or is capable of modifying said second register.

In a variant, only the management software or the software performing its own update are authorized to modify the switch register, and, preferably, are capable of prohibiting the writing on the executable register when it is checked and until the switch register corresponding to said software has been updated.

In a variant, a file of the software being stored on a third register, the first register comprises at least one encryption key and a random secret number having been mixed or concatenated with the file of the software stored in the third register, and the second register further comprises at least one hashed word, called "the hash", encrypted by means of said encryption key contained in the first register, of the file resulting from the mixing or the concatenation. That offers a very high level of security for checking that the software whose file is on the third register is indeed that filed initially and which has given rise to the data of the second register, notably if the number of decryption tests is restricted in time, the only solution being to try with all the possible random numbers to be able to falsify the file.

Preferably, each of the pieces of software are executed on a processor or an independent virtual processor.

Identification within a Network

Said at least one associated information item of the first register can be needed for the identification of said processor in a network within which the unit moves around.

Said at least one associated information item of the first register can be needed for the communication with one or more servers of the network and/or one or more other units of the network.

In the case where the software is modified and the second register is or has to be modified, leading to the modification of the first register, the unit can then be identified with the other units of the network within which they move around only if it has been able to communicate to them, upon a last use of the software before modification, information which will allow them to communicate when the unit restarts with the software after modification. The unit can then use the first register recently modified to be identified; said first register being needed for the use of said software and for the identification of the unit.

The first register can be altered from the first modification of the second register, this alteration rendering inoperative the important functionality of the identification software with the network, notably with server or servers. The unit, after the first register will have ceased being altered by writes on the second register, but before being restarted, will therefore repopulate this first register if necessary and inform the server or the other units or the other functionalities of the unit with which it can communicate thereof.

Device

Also a subject of the invention is a device for securing the use of software intended to be executed by an electronic processor of a unit, notably for the implementation of the method according to the invention, the device being incorporated in or having access to said electronic processor, and comprising or having access at least to a first register on which there is at least one associated information item previously generated and needed to access data used by said software and/or to encrypt or decrypt communication data with another unit intended for or derived from the software, and to a second register containing a file of the software and/or data needed to identify or to encrypt a file of said software, notably a hash, the device comprising at least one electronic circuit configured such that, upon any modification of the second register or any request to modify said second register, the first register is reinitialized or said at least one associated information item of the first register is modified in a predefined manner, such that, in order to access data used by and/or derived from said software, a subsequent modification of the first register is authorized following this reinitialization or this first modification by an instruction of the software having initiated the modification of the second register.

The electronic circuit is advantageously configured to detect the application, at a predefined point of the electronic circuit, of a first predefined voltage indicating the modification of the second register or a modification request, and to apply, following this detection, a second predefined voltage at another predefined point of the electronic circuit, the application of said second voltage provoking the reinitialization of the first register or the modification in a predefined manner of said at least one associated information item of the first register.

The electronic circuit is preferably configured such that the modification of the second register is permitted only if all the bits of the first register are equal to zero, this condition being borne out by a prior reading of the first register and the recording of the greatest value of the bits read, notably recorded or calculated on a third register that is included or to which the device has access, the modification of the second register being prevented if the value recorded, after reading the first register, is equal to one.

The device according to the invention comprises:
  a first memory register and a second memory register, called security and executable registers, as described previously, and, preferably:
  memory registers for each of the pieces of software for which protection is ensured, and, preferably,
  an additional executable register and an additional security register allowing the entry on such registers and the checking thereof before being designated as usable, as well as a register called switch register,
  a module configured to generate random numbers, symmetrical keys and one-time keys, and/or
  a module configured to generate pairs of asymmetrical keys, and/or
  a module configured to calculate hashes,
  a module configured to calculate and/or check electronic signatures, notably using symmetrical, asymmetrical keys or random hashes,
  a module configured to encrypt and decrypt by using symmetrical, one-time or asymmetrical keys, and
  a module configured to check the physical integrity of the electrical circuits and electronic components.

A failure or a software or hardware error that may lead to the corruption of one of the executable files, executable registers or security registers, at least one piece of software secured by the unit and its associated security register, notably that which makes it possible to install other software as well as its associated information, is advantageously coded on a memory, preferably non-erasable, notably of ROM type, and preferably not accessible to the processors but copyable on one of the executable and security registers. This thus makes it possible to establish a secured connection with a server which can then command the updating of said software and the possible installation of other software.

The device according to the invention also comprises, preferably, a physical protection means for the content of some of the memory registers of the unit, notably the first so-called security registers, not to be observable even with sophisticated observation means, such as, for example, electronic microscopes or by the short-circuiting of certain electronic circuits, without the access required for such actions triggering the erasure of said registers.

To avoid having the processor or processors and the memory that it or they use being replaced by others and accessing the functionalities of the security register, the latter and the processor or processors linked to the unit and the memory used by said processors are preferably arranged so that any physical modification of said processor or any physical modification of the memory, or any electrical disturbance is detected and leads to the erasure of the first register, called security register.

The device according to the invention can have currents circulate in microcircuits surrounding said processors and memory registers, and preferably when the latter are powered up, and measure the intensity of said currents and/or the inductance of each of these circuits and/or the capacitance between each or some of these circuits, and/or the time taken by an electrical signal to flow through the circuit or circuits. Any variation of one of these measurements or any variation with respect to a reference state may indicate a physical modification, probably in order to access the circuits of the processors or of the memory. The device can also comprise an electrical battery or an electrical button cell configured to perform these checks when the circuit is not powered up.

Advantageously, the device can enter, upon the implementation of the method according to the invention in the case of a communication of messages, the identity, and notably the name, the publisher and the version of the software, notably if such information is entered on the second register; this entry can be done by the addition of headers to the messages communicated, this header then advantageously forming part of the message to which the encryption or the electronic signature relates.

The features stated above for the method apply to the device, and vice versa.

Computer Program Products

Also a subject of the invention is a computer program product for the securing of the use of software intended to be executed by an electronic processor, said electronic processor comprising or preferably having access to functionalities of encryption and/or decryption and/or verification of electronic signatures needing digital keys stored on a first register, called security register, which is erased upon any modification of a second register, called executable register, on which the code of the secured software is entered or in which a hash or a random hash, possibly encrypted, present on the second register, called executable register, is used to check the authenticity of the software before or during the execution thereof.

Also a subject of the invention is a computer program product for the implementation of the method for securing the use of software intended to be executed by an electronic processor of a unit according to the invention, said electronic processor comprising or having access at least to a first register on which there is at least one associated information item previously generated and needed to access data used by said software and/or to encrypt or decrypt communication data with another unit intended for or derived from the software, and to a second register containing at least one file of the software and/or data needed to identify or to encrypt a file of said software, notably a hash,
the computer program product comprising a medium and, stored on this medium, processor-readable instructions so that, when executed, upon any modification of the second register or any request to modify said second register, the first register is reinitialized or said at least one associated information item of the first register is modified in a predefined manner, such that, in order to access data used by and/or derived from said software, a subsequent modification of the first register is authorized following this reinitialization or this first modification by an instruction of the software having initiated the modification of the second register or by previously determined authorized software.

The features stated above for the method and the device apply to the computer program products.

The invention relates also to a computer-readable information medium, comprising instructions of a computer program product allowing the functionalities mentioned above.

Unit and Applications of the Invention

The unit can be any electronic unit comprising at least one electronic processor.

Preferably, all the software executed by the unit is started up by using the method according to the invention. If software is authorized to be executed without having been started up according to the method, such software having access to the securing device is preferably installed in a virtual part of the processor that is protected, both in memory read and write modes, from the possible actions of the software not started up by said securing device.

Identifiers of the other software executed by the unit, and notably such software started up by the unit, are also advantageously transmitted with any communication, possibly as well as the hash or the random hash thereof; a remote device then being able to check if necessary that all such software has been checked as not posing any security problem.

The device can be used notably:
  to secure the exchanges of information with a remote data server,
  to transport data and exchange them with other similar units connected to the same server or to servers connected together,
  to take measurements then communicate them to a remote server, these measurements being able to be for example:
    physical measurements of pressure, of temperature, of heat, of dimension, or the like,
    metrological measurements such as atmospheric temperature, the speed and direction of the wind, rainfall or wave height,
    measurements of consumption such as quantities of electricity passing through a cable, or quantity of heat in a heating pipe, or of water in a water duct,
    measurements of use of parts situated in machines or of machines themselves, geolocation measurements,
    kinematic measurements such as the speed or the acceleration and the direction of a vehicle,
  to secure data transmissions from and to a server,
  to retransmit video images or sounds to a server,
  to retransmit to a server the identities of RFID chips passing through its field of "view", or
  to control, from a server or another object connected to said server, a door or window lock,
  to secure the firmware of network routers,
  to secure the firmware of chip cards,
  to secure the firmware of chip card readers or multiple readers, with or without contact.

BRIEF DESCRIPTION OF THE DRAWINGS

The invention will be able to be better understood on reading the following detailed description, of exemplary nonlimiting implementations thereof, and on studying the attached drawing, in which.

DETAILED DESCRIPTION

Figure 1:
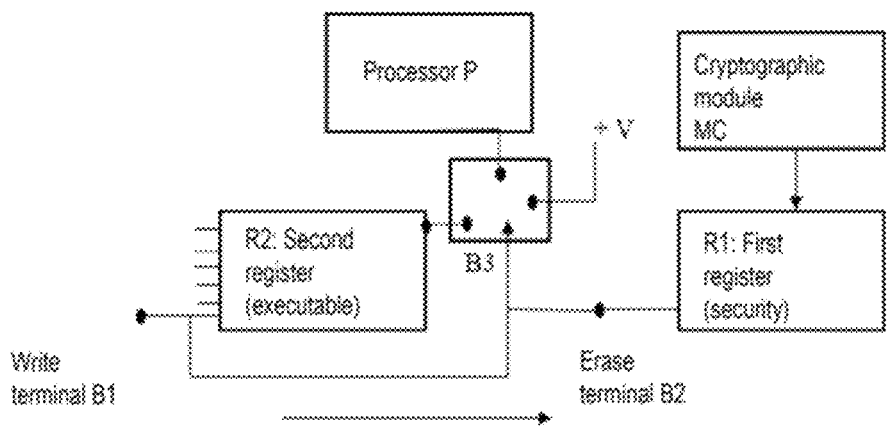
FIG. 1 represents an example of device for securing the use of software according to the invention.

FIG. 1 illustrates an example of device according to the invention, for the securing of the updating of software intended to be executed by an electronic processor P of a unit.

In this example, the software is start-up software of the processor P, and a file of the software, its signature, an encryption key for decrypting a file of said software stored in encrypted form are stored in a second, so-called executable register R2, to which the electronic processor P has access. The latter also has access to a cryptographic module MC which can read a first, so-called security register R1, on which there is at least one associated information item previously generated and needed to access data used by said software and/or to encrypt or decrypt communication data with another unit intended for or derived from the software. The processor P also has a direct write-mode access to the security register but it does not have direct read-mode access.

A voltage applied to the write terminal B1 making it possible to write on the executable register R2 leads to the application of a voltage on the erase terminal B2 of the security register R1.

The software being loaded in the processor and communicating with a server can, to perform its own update:
download the new version and its signature
check the new version by copying said new version in the cryptographic module for the latter:
  to decrypt the signature by using the public key of the publisher entered on the security register
  to calculate the hash of the software
  to compare the hash and the decrypted signature
download new encryption keys to communicate with the server after the update, and a possible new public key of the software publisher
check the new version of the encryption keys by copying said new version in the cryptographic module for the latter:
  to decrypt the signature by using the public key of the server entered on the security register
  to calculate the hash of the keys
  to compare the hash and the decrypted signature
copy the downloaded software on the executable register R2
if necessary copy the new signature on the security register R1
copy the new encryption keys to communicate with the server on the security register R1
initialize the restart of the processor.

Processor Start-Up
The processor P starts up by loading the software present in the executable register R2.

Communication with the Server
To send secured data to the server, the processor P sends the unsecured data to the cryptographic module which returns the data to it secured, that is to say for example encrypted and signed, and that the processor then sends to the server via a data network such as the Internet.

To receive secured data from the server, the processor sends the data that it has received secured via a data network such as the Internet, to the cryptographic module which returns them to it decrypted having checked their possible signature.

Figure 2:
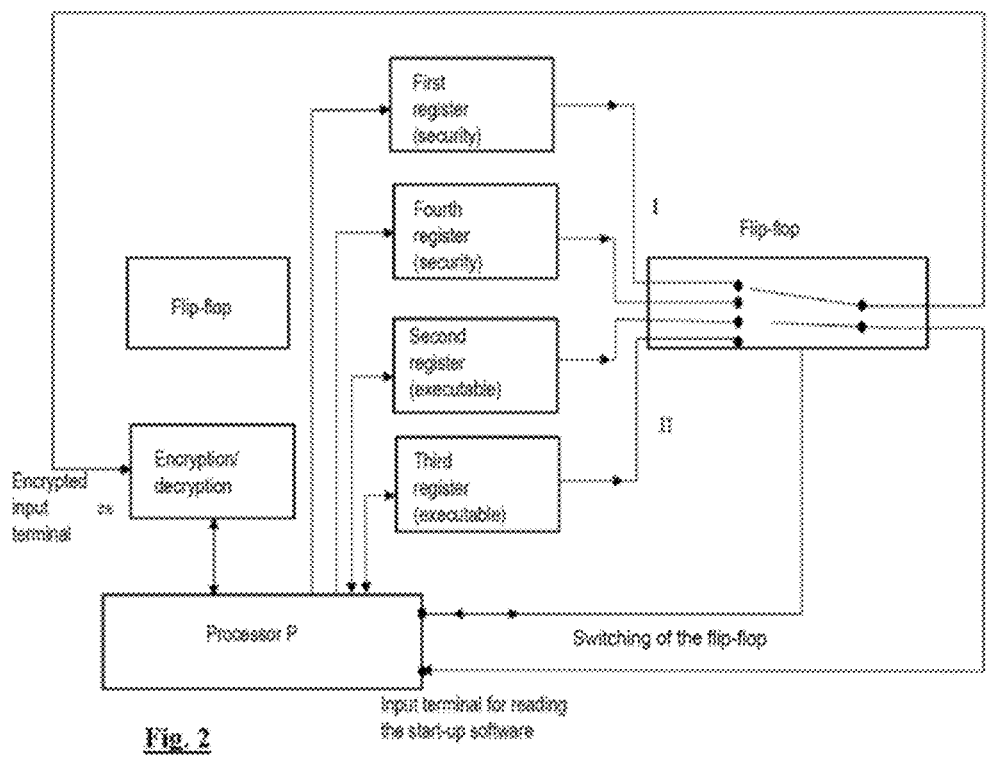
FIG. 2 represents a variant device for securing the use of software according to the invention.

In a second example illustrated in FIG. 2, to avoid having the unit no longer able to operate if it is stopped between the erasure of the first, security register R1 and the writing thereon of modified and valid data, the device according to the invention also has access to a third register R3, called "executable A" register, on which can be stored a file of the software or a key making it possible to decrypt and/or to check the signature thereof, and a fourth register R4, called "security A" register, of which the associated information is modified upon any update of the second register R2, as well as a flip-flop and a switch register R5 indicating a choice of the executable register R2 or R3 and of the security register R1 or R4 from which the information should originate to respectively start-up the software or inform the cryptographic module with cryptographic keys and other values retained in the security register.

The processor can choose to switch over the flip-flop for it to read either the registers R1 and R4 or the registers R2 and R3. The switching of said flip-flop is remanent, that is to say that the choice of one or other pair of registers does not change even if the processor is stopped or the circuits are powered down. Only an instruction from the processor making it possible to change this choice. Preferably, the flip-flop can also inform the processor as to the choice on which it has been positioned.

Processor Start-Up
The processor starts up by reading the code supplied by the flip-flop originating from one of the two executable registers.

Processor Update:
The processor:
downloads the new version of the software and its electronic signature and new keys to communicate with the server after the update.
Transfers the new software and the electronic signature to the encryption module.
The encryption module decrypts the software and the new encryption keys and their signatures using, respectively, a symmetrical key and a public key issued by the issuer of said software for said software and by the server for the encryption data, present on the security register with which the flip-flop allows communication.
The decryption module returns the software decrypted, and checked to have been signed by the publisher whose public key is on the security register as well as the encryption data likewise decrypted and the origin of which has been checked.
The processor then enters, on the unused executable register and on the unused security register, the new version of the software and the new encryption data and hash of the new version of the software.
The processor checks that the entry made in the preceding step does not include any write error.

The processor actuates the flip-flop.
The processor restarts.

Processor Communication with the Server:

To send secured data to the server, the processor returns the unsecured data to the cryptographic module which returns the data secured, that is to say for example encrypted and signed, and that the processor then sends to the server via a data network such as the Internet.

To receive secured data from the server, the processor sends the data that it has received secured via a data network such as the Internet, to the cryptographic module which returns the data decrypted having checked the possible signature thereof.

The cryptographic module interrogates the security register to which it is linked by the flip-flop to know the keys and other parameters to be used for the encryption, decryption and certification operations.

Figure 3:
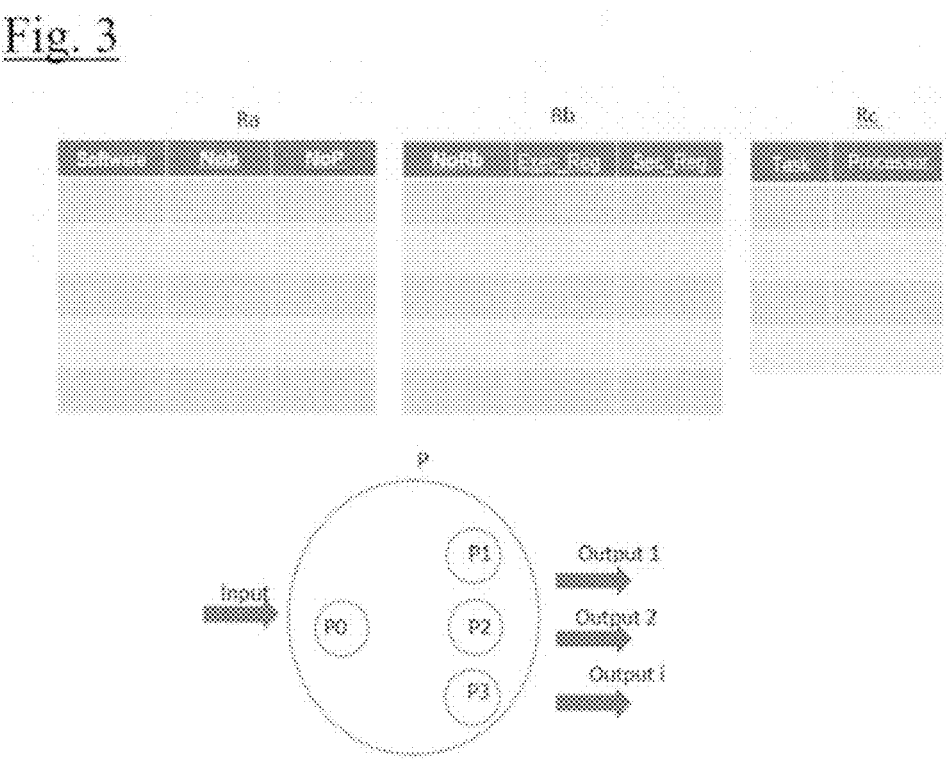
FIG. 3 represents an example of contents of the switch register according to the invention.
Figure 5:
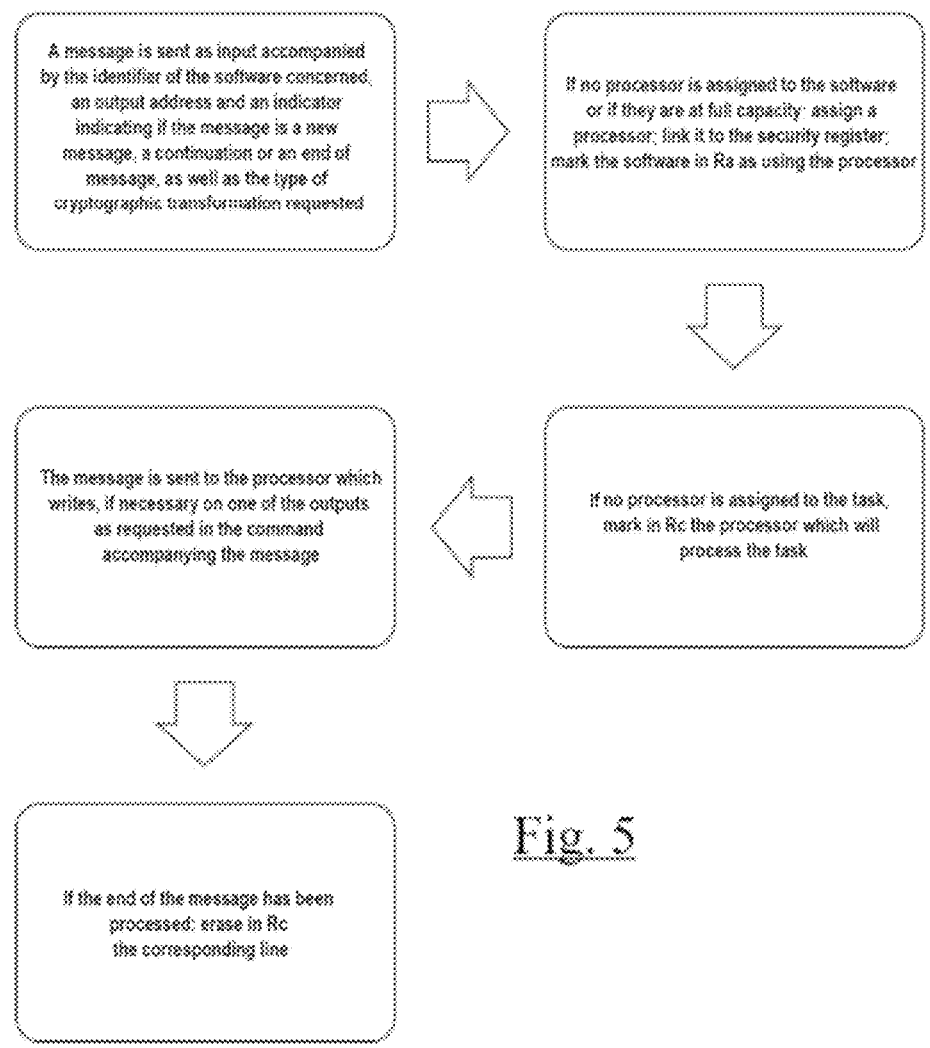
FIG. 5 represents another example of steps of use of a device according to the invention.

In the embodiment illustrated in FIG. 3, an independent processor P0 manages the inputs/outputs of the security device, the assignment of the cryptographic modules P1, P2, . . . , Pi to the various cryptographic tasks and ensures the management of the executable and security registers; the device having several cryptographic modules that can work simultaneously as described in FIG. 5.

The device comprises in particular three registers Ra, Rb, Rc organized in the form of tables, the registers Ra and Rb being permanent and the register Rc being permanent if cryptographic processing has been performed on either side of a power outage.

The register Ra associates with software, on the one hand, the number of the line of the register Rb in which its executable register and its security register are located and, on the other hand, the list of the cryptographic modules processing data for said software. The register Rc lists the cryptographic processing tasks currently underway and indicates, for each task, the number of the cryptographic module which did the calculations. A cross-referencing of the tables Ra and Rc therefore makes it possible to retrieve the identifier of the software which has initiated each of the cryptographic tasks.

Figure 4:
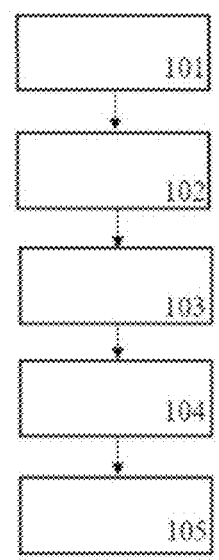
FIG. 4 represents an example of steps of use of a device according to the invention.

FIG. 4 illustrates an example of management of the executable and security registers, by the processor which is entrusted by an external main processor with the task of storing software in the device.

In a step 101, it is checked that the software requesting the installation is indeed one of the pieces of software started up from one of the executable registers of the tables Ra and Rb, by asking to decrypt a random number with a key retained in the processor P0, generated and communicated to the software when it was started up; since the software has the right to enter new software in the device or to modify a stored version thereof. The software stored on the first executable register can for example be the only software authorized to modify or install other software. In a step 102, the device searches in Rb for a free line. In a step 103, the device writes on the free line of the register Rb the code of the software and the security data. In a step 104, the information is once again sent to the register Rb for checking. In a step 105, the number of the line of the register used is entered in the column Nob of the register Ra for the record corresponding to the software, or, if the software is not yet listed therein, on a free line of the register Ra, the identifier of the software being also entered therein. The updated software is restarted if it was executed during this update. Alternatively, this final step consisting in updating the register Ra is performed only if the updated software is not currently being executed, the updating of said register Ra then occurring only when said software is shut down.

If only the signature or the hash of the software or else the hash of the software mixed with a secret number is entered in an executable register and not a file of the software, the suitability of the signature, or of the hash stored in said executable register is preferably systematically checked before said software is started up. The public key of the publisher of the signature of said software can have been stored on the security register, as well as, if necessary, the secret mix number, at the time of the updating of the software and the placing of the file of the software entered on the executable register. To avoid having the processor try multiple times to circumvent the checking by using chance random numbers, the number of check tests is preferably limited in time.

FIG. 5 represents the various steps of the method by which the device responds to the request from software secured by said device by carrying out cryptographic operations.

The invention claimed is:

1. A method for securing the use of software intended to be executed by an electronic processor of a unit, said electronic processor comprising or having access at least to
    a first register (R1) on which there is at least one associated information item previously generated and needed to access data used by said software and/or to encrypt or decrypt communication data with another unit intended for or derived from the software, and to
    a second register (R2) containing at least one file of the software and/or data needed to identify or encrypt a file of said software, notably a hash, a method in which, upon any modification to the second register (R2) or any request to modify said second register, the first register (R1) is reinitialized or said at least one associated information item of the first register is modified in a predefined manner, such that, in order to access data used by and/or derived from said software, a subsequent modification of the first register (R1) is authorized following this reinitialization or this first modification by an instruction of the software having initiated the modification of the second register (R2) or by previously determined authorized software,
the method using an electronic circuit, incorporated in or connected to said electronic processor, configured at least to detect any modification of the second register (R2) or any request to modify said second register, and to, following this detection, reinitialize the first register (R1) or modify in a predefined manner said at least one associated information item of the first register.

2. The method as claimed in claim 1, wherein the first register (R1) is reset to zero upon any modification of the second register (R2) or any request to modify said second register.

3. The method as claimed in claim 1, wherein said at least one associated information item of the first register (R1) is modified by a value that is known or generated by said electronic processor of the unit, or by a value transmitted to the unit, or by a value that is previously known and/or transmitted to a server or to another unit of a network within which the unit moves around.

4. The method as claimed in claim 1, wherein said at least one associated information item of the first register (R1) comprises at least one or more encryption keys, notably symmetrical, asymmetrical, public, private keys, or series of one-time keys, or comprises at least one or more numbers having been generated randomly.

5. The method as claimed in claim 1, wherein said software is start-up software of the electronic processor.

6. The method as claimed in claim 1, wherein, a file of the software being stored in encrypted form on a third register (R3), the second register (R2) comprises at least one or more encryption keys used in the decryption and/or in the checking of the signature of said encrypted file, notably a symmetrical or asymmetrical key.

7. The method as claimed in claim 1, wherein only management software or the software of which a file is contained in the second register (R2) or in a third register (R3) is authorized to modify or is capable of modifying said second register (R2).

8. The method as claimed in claim 1, wherein only the software of which a file is contained in the second register (R2) or of which the signature is entered on the second register is authorized to modify or is capable of modifying said second register (R2).

9. The method as claimed in claim 1, wherein, a file of the software being stored on a third register, the first register (R1) comprises at least one encryption key and a random secret number having been mixed or concatenating with the file of the software stored in the third register, and the second register further comprises at least one hashed word, encrypted by means of said encryption key contained in the first register, of the file resulting from the mixing or the concatenation.

10. The method as claimed in claim 1, wherein, the software being management software ensuring the management of one or more other third-party pieces of software, the electronic processor of the unit comprises or has access to a switch register (R5), containing at least, for each of these other third-party pieces of software, the identifier of the first and second registers of each of these pieces of software.

11. The method as claimed in claim 1, wherein said at least one associated information item of the first register is used for the identification of said processor in a network within which the unit moves around.

12. A device for securing the use of software intended to be executed by an electronic processor of a unit, notably for the implementation of the method as claimed in claim 1, the device being incorporated in or having access to said electronic processor, and comprising or having access at least to a first register (RI) on which there is at least one associated information item previously generated and needed to access data used by said software and/or to encrypt or decrypt communication data with another unit intended for or derived from the software, and to a second register (R2) containing a file of the software and/or data needed to identify or encrypt a file of said software, notably a hash, the device comprising at least one electronic circuit configured such that, upon any modification of the second register (R2) or any request to modify said second register, the first register (RI) is reinitialized or said at least one associated information item of the first register is modified in a predefined manner, such that, in order to access data used by and/or derived from said software, a subsequent modification of the first register (RI) is authorized following this reinitialization or this first modification by an instruction of the software having initiated the modification of the second register (R2) or by previously determined authorized software, said electronic circuit being incorporated in or connected to said electronic processor, and being configured at least to detect any modification of the second register (R2) or any request to modify said second register, and to, following this detection, reinitialize the first register (RI) or modify in a predefined manner said at least one associated information item of the first register.

13. The device as claimed in claim 12, wherein the electronic circuit is configured to detect the application, at a predefined point of the electronic circuit, of a first predefined voltage indicating the modification of the second register (R2) or a modification request, and to apply, following this detection, a second predefined voltage at another predefined point of the electronic circuit, the application of said second voltage provoking the reinitialization of the first register or the modification in a predefined manner of said at least one associated information item of the first register.

14. A non-transitory computer program product for the implementation of the method, as defined in claim 1, for securing the use of software intended to be executed by an electronic processor of a unit, said electronic processor comprising or having access at least to a first register (RI) on which there is at least one associated information item previously generated and needed to access data used by said software and/or to encrypt or decrypt communication data with another unit intended for or derived from the software, and to a second register (R2) containing at least one file of the software and/or data needed to identify or encrypt a file of said software, notably a hash, the computer program product comprising a medium and, stored on this medium, processor-readable instructions so that, when executed, upon any modification of the second register (R2) or any request to modify said second register, the first register (RI) is reinitialized or said at least one associated information item of the first register is modified in a predefined manner, such that, in order to access data used by and/or derived from said software, a subsequent modification of the first register (RI) is authorized following this reinitialization or this first modification by an instruction of the software having initiated the modification of the second register (R2) or by previously determined authorized software.

* * * * *